May 29, 1951  A. O. ST. DENIS  2,554,685
DETACHABLE TRAY FOR THE INSIDE OF MOTOR VEHICLE DOORS
Filed Sept. 11, 1948
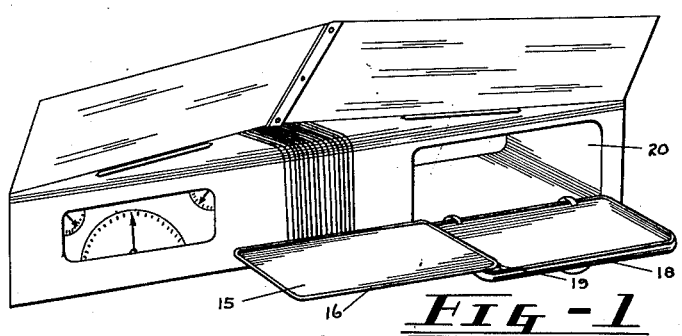
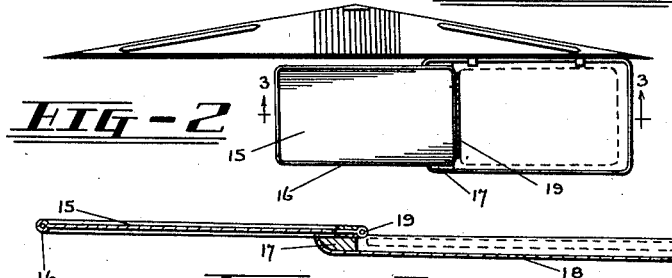
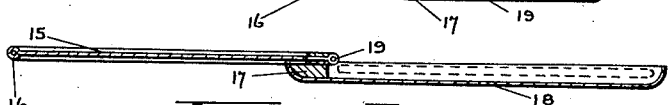
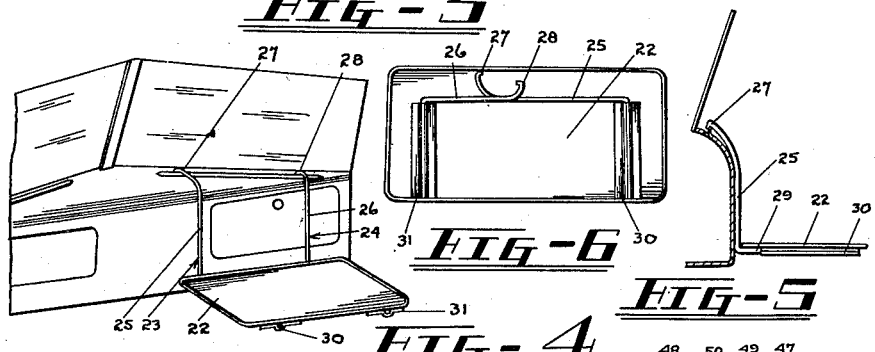
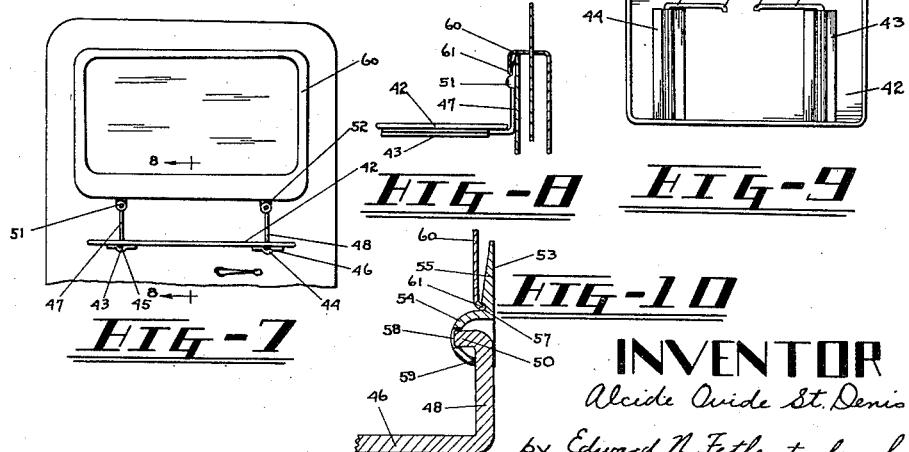
INVENTOR
Alcide Ovide St. Denis
by Edward N. Fetherstonhaugh
ATTORNEY Patented May 29, 1951

2,554,685

UNITED STATES PATENT OFFICE 2,554,685

DETACHABLE TRAY FOR THE INSIDE OF MOTOR VEHICLE DOORS

Alcide Ovide St. Denis, Montreal, Quebec, Canada

Application September 11, 1948, Serial No. 48,830

1 Claim. (Cl. 311—21)

The invention relates to improvements in trays for vehicles, as described in the present specification and illustrated in the accompanying drawings that form a part of the same.

The invention consists essentially of the novel features of construction as pointed out in the claim for novelty following a description containing an explanation in detail of acceptable forms of the invention.

The objects of the invention are to devise trays for use in vehicles, such as automobiles, that will supply a handy surface on which to place lunches, bottles and other articles and which, when not in use, are easily removed and stored away; to furnish a tray for the use of the occupants of an automobile that may be located within easy reach and readily made available for use; to equip motor vehicles adaptable to permit a tray to be supported from the inside of the doors thereof; to construct trays for vehicles consisting of few and simple parts, easy and economical to manufacture; and generally to provide trays for vehicles that are easy to position and made ready for use and that are sufficient for their purpose.

In the drawings:

Figure 1 is a perspective view of a tray ready for use, foldably mounted on the glove compartment door in an automobile.

Figure 2 is a plan view of Figure 1.

Figure 3 is a cross-sectional view as taken on the line 3—3 in Figure 2.

Figure 4 is a perspective view of a modified type of tray mounted on the dash of an automobile.

Figure 5 is a side view of the modification shown in Figure 4.

Figure 6 is a plan view of the tray shown in Figure 5 as removed from the dash and showing its supports folded in its closed position.

Figure 7 is a front view of a further modified form of tray showing same mounted to the inside of one of a car's windows.

Figure 8 is a cross sectional view as taken on the line 8—8 in Figure 7.

Figure 9 is a bottom plan view of the tray shown in Figures 7 and 8, as removed from its support and showing the bracket supports folded in a closed position.

Figure 10 is an enlarged fragmentary sectional view of the bracket mounting and showing the bracket or tray support as secured thereto.

Like numerals of reference indicate corresponding parts in the various figures.

While the invention is hereinafter described and illustrated as being used in an automobile, it is equally applicable in connection with boats, planes, busses, and other places where a utility tray may be usefully employed.

Referring to the drawings, the tray, as indicated by the numeral 15, is preferably made of metal of a predetermined thickness and, in this instance, rectangular in shape, a bead 16 being formed along its outside edges and providing the tray with shallow sides. The tray is preferably flat surfaced with respect to its supporting surface.

The tray is pivotally mounted to the glove compartment door of the automobile, a block or spacer 17, preferably of wood, is suitably secured to the inside face of the door 18 of the compartment adjacent to one end, preferably the end nearest the steering wheel, and extending across the end portion of the door. This spacer or support 17 forms a mounting for the tray 15, and is of a predetermined width and height, the inner end of the tray being positioned on top of the spacer and secured thereto by means of a hinge or hinges 19 adapting the tray to be folded back and down on the inside face of the door. The tray is of somewhat smaller dimensions than the inside face of the door 18, permitting it to fold back against the same and to close into the compartment 20 when the door is shut.

In the modification shown in Figures 4, 5 and 6, the tray 22 itself is similar to that hereinabove described and illustrated, with the exception that it is not a hingedly mounted tray, but is secured to the support arms 23 and 24 which engage with the air vent on the top of the dash. These support arms are L-shaped, the upper end of the vertical portion, 25 and 26 respectively, being formed with a hook, 27 and 28 respectively, the lower or horizontal portion 29 of the support arms having the tray secured thereto by means of the brackets 30 and 31. Each of these brackets extends from the front edge of the tray, or adjacent thereto, back a predetermined distance and are suitably and firmly secured to the underside of the tray, the horizontal portions of the support arms entering the brackets at their rear or inner end and extending part ways therethrough, and being movable therein.

In using the tray, the support arms are hooked in the air vent, the tray extending horizontally out from the front face of the dash, the support arms being of unequal length to allow for the slight slope of the dash. When not in use, the tray is removed from its mounted position by removing the support arms from the air vent, turning the support arms inward and then sliding them forward in the brackets for their full length to position the hooked ends flat against the under side of the tray, as shown in Figure 6, the tray, with the support arms in their closed position, now being ready to be stored away.

Figures 7, 8, 9 and 10 illustrate a further modification, adapted to be used on the inside of a door directly under a window, the window frame providing an anchorage for the support assembly of the tray.

The tray 42 is similar to the modified form of the tray 22 hereinabove described and illustrated, having a pair of brackets 43 and 44 suitably secured to the under side and adapted to slidably accommodate the support arms 45 and 46, which arms are the same as the support arms 23 and 24 of the modification shown in Figure 4, with the exception that the vertical portion of each of the arms, 47 and 48 respectively, terminates in a short turned-in portion forming a shallow hook, 49 and 50 respectively.

Each of the hooks on the support arms is adapted to be inserted in a mounting bracket, 51 and 52 respectively, the arms being suspended therefrom. These mountings 51 and 52 are preferably made of metal and are of a predetermined length or height, the rear face or back 53 being flat surfaced. The lower portion of the mounting being of bulbous formation and forming the front face of that portion of the mounting, the upper front portion of the mounting tapers outward and downward from the top end at a predetermined angle and terminates just short of the blister 54, the juncture of the tapering face 55 and the top inner end of the blister 54 forming an arcuate groove 57. The blister or bulb-like protuberance 54 is hollow, and may be formed with an aperture 58 in its front face and another opening 59 in the bottom, or, if desired, this blister portion of the mounting may be provided with the bottom opening only.

The tapering top section 55 is adapted to be positioned under the bottom of the window frame 60, the in-turned lip portion 61 of the window frame or casing engaging the groove 57 to hold the mounting firmly in position. The support arms are mounted in their respective mounting by merely inserting same through the bottom aperture, the hook being placed through the opening and positioned in the aperture 58, the support arm thus being suspended from the mounting; the tray then being positioned on the arms. The hook portion of the support arms is slightly narrower than the inside of the blister, allowing for sufficient movement therein whereby the support arms may be properly positioned or connected to the blister.

In removing the tray from use, the support arms are withdrawn from the mountings, the support arms being slid into their brackets and turned to lie against the under side of the tray, as illustrated in Figure 9.

What I claim is:

In trays for vehicles, a tray, a bead formed along the edges of said tray, a pair of brackets located on the underside of said tray and fixedly secured thereto, a pair of L-shaped support arms engaging in said brackets, a short turned in portion formed on the free ends of each of said support arms, a pair of mounting brackets having a flat rear surface, the lower portion of each of said mounting brackets being of a bulb-like formation on the front face thereof and the upper portion of each of said mounting brackets being tapered so as to facilitate engagement thereof with the window frame of a vehicle, and the juncture of the bulb-like formation and the tapering portion of each of said mounting brackets forming an arcuate groove which is engaged by the lower edge of the window frame, the bulb-like formation of each of said mounting brackets being hollow and having an aperture extending through the front face and another opening in the bottom thereof, and the free ends of each of said support arms being inserted in the opening in the bottom of each of said mounting brackets and then hinged downward until the short turned-in portion of each engages in the hollow section of the bulb-like formation and enters the aperture in the front face thereof, thus substantially securing said support arms to said mounting brackets and accordingly providing a means of supporting said tray.

ALCIDE OVIDE ST. DENIS.

REFERENCES CITED

The following references are of record in the file of this patent:

UNITED STATES PATENTS

| Number | Name | Date |
| --- | --- | --- |
| 1,308,066 | Hayes | July 1, 1919 |
| 1,630,889 | Clark | May 17, 1927 |
| 1,836,511 | Severns | Dec. 15, 1931 |
| 1,900,760 | Pendleton | Mar. 7, 1933 |
| 1,925,523 | Cuff et al. | Sept. 5, 1933 |
| 2,002,328 | Mitchell | May 21, 1935 |
| 2,050,951 | Hundertmark | Aug. 11, 1936 |
| 2,101,686 | Offutt | Dec. 7, 1937 |
| 2,189,607 | Krischke | Feb. 6, 1940 |
| 2,207,667 | Holly | July 9, 1940 |
| 2,270,948 | Howe | Jan. 27, 1942 |
| 2,314,550 | Olman | Mar. 23, 1943 |
| 2,492,230 | Lichten | Dec. 27, 1949 |

FOREIGN PATENTS

| Number | Country | Date |
| --- | --- | --- |
| 434,898 | Great Britain | Sept. 11, 1935 |